(12) United States Patent
Wagner et al.

(10) Patent No.: US 9,060,074 B2
(45) Date of Patent: Jun. 16, 2015

(54) METHOD AND SYSTEM FOR COMMUNICATION

(75) Inventors: Joerg Wagner, Kelowna (CA); Corey Wagner, Kelowna (CA)

(73) Assignee: Axxess Industries Inc., Kelowna BC (CA)

(*) Notice: Subject to any disclaimer, the term of this patent is extended or adjusted under 35 U.S.C. 154(b) by 0 days.

(21) Appl. No.: 13/997,653

(22) PCT Filed: Dec. 24, 2011

(86) PCT No.: PCT/US2011/067312
§ 371 (c)(1),
(2), (4) Date: Feb. 10, 2014

(87) PCT Pub. No.: WO2012/088544
PCT Pub. Date: Jun. 28, 2012

(65) Prior Publication Data
US 2014/0219431 A1    Aug. 7, 2014

Related U.S. Application Data

(60) Provisional application No. 61/427,164, filed on Dec. 24, 2010.

(51) Int. Cl.
*H04M 11/00* (2006.01)
*H04M 9/00* (2006.01)
*H04M 1/60* (2006.01)
*H04M 11/02* (2006.01)

(52) U.S. Cl.
CPC .................................. *H04M 11/025* (2013.01)

(58) Field of Classification Search
CPC ........ G08B 3/00; G08B 13/08; G08B 15/002; G08B 15/004; H04M 15/00; H04M 225/00; H04M 2250/112; H04M 2250/52; H04M 11/025

USPC .......... 379/114.01, 142.01, 142.17, 156, 157, 379/159, 167.01, 167.02, 167.05, 167.07, 379/167.11, 167.12, 167.14, 102.07
See application file for complete search history.

(56) References Cited

U.S. PATENT DOCUMENTS

| | | | |
|---|---|---|---|
| 5,086,385 A * | 2/1992 | Launey et al. | 700/83 |
| 5,565,857 A * | 10/1996 | Lee | 340/5.42 |
| 6,483,910 B1 * | 11/2002 | Council | 379/127.01 |
| 7,783,018 B1 * | 8/2010 | Goldberg | 379/102.06 |
| 7,936,885 B2 * | 5/2011 | Frank et al. | 381/57 |
| 8,375,118 B2 * | 2/2013 | Hao et al. | 709/223 |
| 2010/0195810 A1 * | 8/2010 | Mota et al. | 379/167.12 |
| 2010/0253470 A1 * | 10/2010 | Burke | 340/5.82 |

* cited by examiner

*Primary Examiner* — Binh Tieu
(74) *Attorney, Agent, or Firm* — Timberline Patent Law Group PLLC

(57) ABSTRACT

A method and system for establishing a communication session between a plurality of communication terminals in an intercom system is disclosed. One of the communication terminals is associated with a room, dwelling, residence, or building structure and is configured to generate a request for establishing a communication session with one or more other mobile communication terminals associated with the room, dwelling, residence, or building structure. The communication session includes one or more of transmission and reception of one or more of an audio, a video, a multimedia, an image, a text and any other form of data that may be transmitted and received by the plurality of communication terminals. The communication session may include transmission and reception of one or more signals such as, but not limited to, an audio, a video, a multimedia, an image, a text and any other form of data by the plurality of communication terminals.

25 Claims, 3 Drawing Sheets

METHOD AND SYSTEM FOR COMMUNICATION

FIELD OF THE PRESENT DISCLOSURE

The present disclosure generally relates to communication systems. More specifically, the present disclosure relates to a method and system of establishing a communication session between a plurality of communication terminals in an communication system associated with a room, residence, dwelling or, building structure, e.g. an intercom system, over one or more of a wired communication link and/or a wireless communication link.

BRIEF DESCRIPTION OF THE FIGURES

The accompanying figures, where like reference numerals refer to identical or functionally similar elements throughout the separate views and which together with the description below are incorporated in and form part of the provisional specification, serve to further illustrate various embodiments and to explain various principles and advantages all in accordance with the present disclosure.

DETAILED DESCRIPTION

Figure 1:
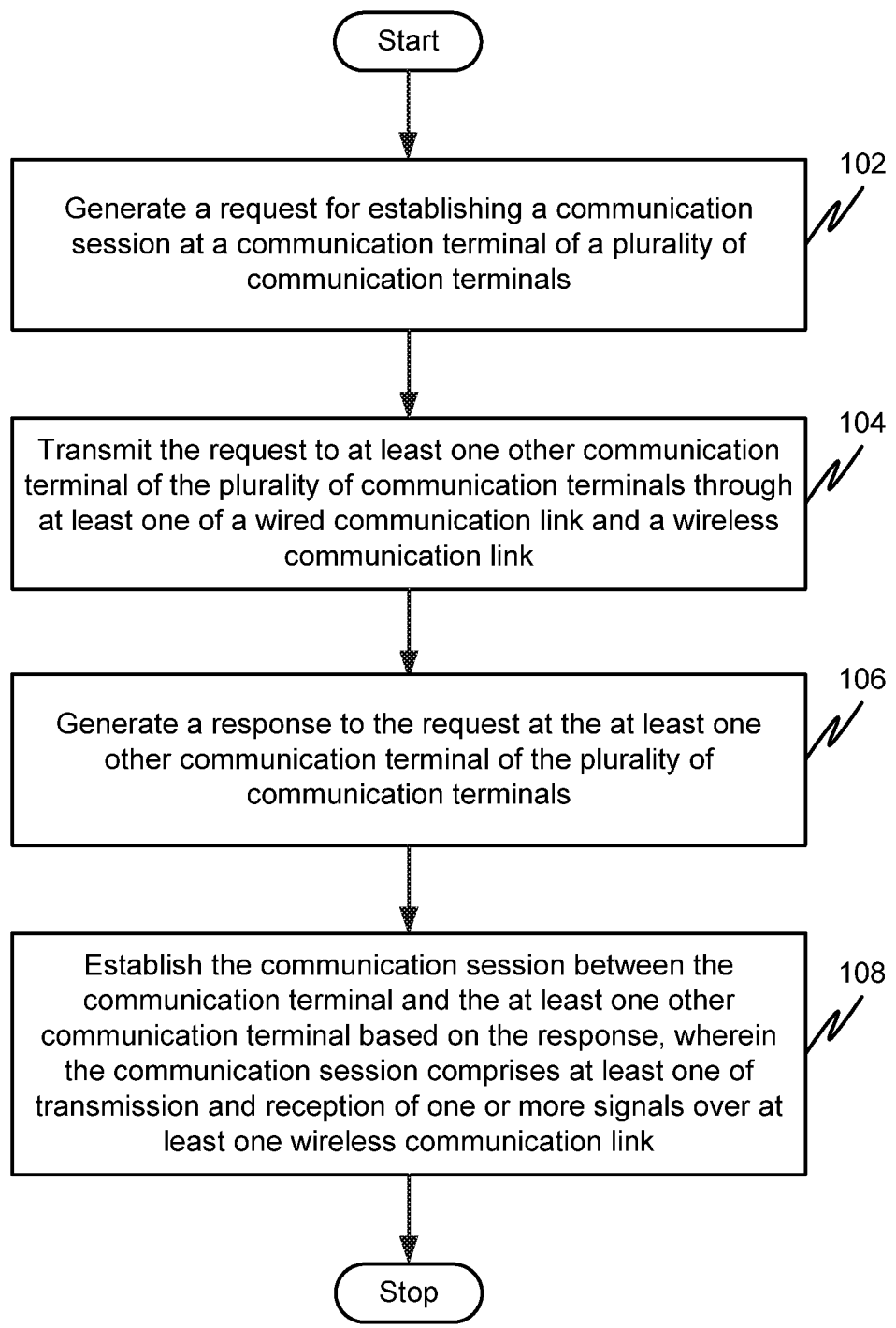
FIG. 1 illustrates a flow diagram of a method for establishing a communication session between a plurality of communication terminals in an intercom system over one or more of a wired communication link and/or a wireless communication link in accordance with an embodiment of the present disclosure.

As required, embodiments of the present disclosure are disclosed herein; however, it is to be understood that the disclosed embodiments are merely exemplary of the present disclosure, which can be embodied in various forms. Therefore, specific functional details disclosed herein are not to be interpreted as limiting, but merely as a representative basis for teaching one skilled in the art to variously employ the present disclosure in virtually any appropriately detailed structure. Further, the terms and phrases used herein are not intended to be limiting but rather to provide an understandable description of the present disclosure.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system that includes a microprocessor device. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Before describing in detail embodiments that are in accordance with the present disclosure, it should be observed that the embodiments reside primarily in combinations of method steps and apparatus components related to method and system for establishing a communication session in an intercom system. Accordingly, the apparatus components and method steps have been represented where appropriate by conventional symbols in the drawings, showing only those specific details that are pertinent to understanding the embodiments of the present disclosure so as not to obscure the present disclosure with details that will be readily apparent to those of ordinary skill in the art having the benefit of the description herein.

In the present disclosure, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present disclosure provide methods and systems for establishing a communication session between a plurality of communication terminals in an intercom system. The method includes generating a request at a first communication terminal of the plurality of communication terminals for establishing the communication session. Thereafter, the request may be transmitted to one or more other communication terminals of the plurality of communication terminals. The request may be transmitted through one or more of a wired communication link and one or more wireless communication links. Subsequent to receiving the request, the one or more other communication terminals may generate a response to the request. Thereafter, the response is transmitted to the first communication terminal. The response may be transmitted through one or more of a wired communication link and one or more wireless communication links. Based on the response, the communication session is established between the first communication terminal and the one or more other communication terminals over, but not limited to, the one or more of a wired communication link and one or more wireless communication links. The communication session may include transmission and reception of one or more signals such as, but not limited to, an audio, a video, a multimedia, an image, a text and any other form of data by the plurality of communication terminals.

FIG. 1 illustrates a flow diagram of a method for establishing a communication session between a plurality of communication terminals in an intercom system over one or more of a wired communication link and/or a wireless communication link. Examples of a communication terminal of the plurality of communication terminals may be, but are not limited to, a camera, a camcorder, a wristwatch, a remote controller of an appliance, a cell phone, a laptop, a desktop computer, an e-book reader, a Personal Digital Assistant (PDA), a handheld media player, a handheld television and any other device capable of communicating with one or more other communication terminals of the plurality of communication terminals.

At step 102, a request is generated at a first communication terminal for establishing the communication session. The request may include, one or more signals such as, but not limited to, an audio, a video, a multimedia, an image, a text and any other form of data that may be transmitted and received by the plurality of communication terminals. The request may be generated using one or more of a manual method and an automatic method. In the manual method, a user of the first communication terminal may perform an action to generate the request. For example, the user may press a button situated on or around the first communication terminal in order to generate the request manually. According to an automatic method, the request may be generated upon detecting the presence of the user in proximity to the first communication terminal. The presence of the user or object may be detected using one or more of motion sensing, image sensing, face or object recognition, voice recognition, gait recognition and body-heat sensing, infrared (IR) scanner, radio frequency (RF) scanner, and so forth. In addition to detecting presence of the user or an object, an identifying characteristic, such as identity, of the user may be determined. The identity of the user may be determined based on one or more of, but not limited to, data entered by the user, a user-ID entered by the user, a password entered by the user, a voice of the user, an image of the user, a scanned IR or RF identification (ID) tag or badge, and a biometric feature of the user. The biometric feature of the user may include, but is not limited to, fingerprint, hand geometry print, signature, retinal print, iris print, and facial bone structure.

In an embodiment, the request is generated based on one or more terminal identifiers corresponding to the one or more other communication terminals. The one or more terminal identifiers may correspond to, without limitation, a hardware serial number, a mobile phone number, a MAC address and an IP address. In an embodiment, the one or more terminal identifiers may be specified by a user of the first communication terminal. In another embodiment, the one or more terminal identifiers may be automatically determined based on one or more of, but not limited to, time information, location information, availability information of one or more users corresponding to the one or more other communication terminals and identity of the user. The one or more terminal identifiers may be an end-point for the request. In yet another embodiment, the one or more terminal identifiers may be automatically determined based on one or more predefined rules. For example, a user of the one or more users corresponding to a communication terminal of the one or more other communication terminals may define a rule such as, "At a time when a request is generated, if the user is at home, then identify an end-point for the request as each communication terminal situated at home." In another example, the user may define another rule such as, "If a request is generated between 1 p.m. and 4 p.m., then identify an end-point for the request as a communication terminal situated in a kitchen and a mobile phone belonging to the user." The user may set this rule, or may set a rule in which any or all of the communication terminals are set to a silent mode, quiet mode, and/or vibration mode, in a scenario wherein, for example, the user's baby sleeps between 1 p.m. and 4 p.m. every day. A rule may also be defined such that if multiple communication terminals are available, the first one to be activated by the user controls communications. The identity of the user may be determined based on one or more of, but not limited to, data entered by the user, a user-ID entered by the user, a password entered by the user, a voice of the user, an image of the user, and a biometric feature of the user. The biometric feature of the user may include, but is not limited to, fingerprint, a hand geometry print, signature, retinal print, iris print, and facial bone structure. For example, based on the image of the user, the user may be identified as a friend. Accordingly, a request may be generated for establishing the communication session.

Subsequent to generating the request, at step 104, the request is transmitted to the one or more other communication terminals of the plurality of communication terminals. The request may be transmitted through one or more of a wired communication link and a wireless communication link. The one or more of a wired communication link and a wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, cellular network, Public Switched Telephone Network (PSTN), Universal Mobile Telecommunication Systems (UMTS), Ultra Mobile Broadband (UMB) network, terrestrial digital TV, radio, and short-range radio.

In an embodiment, the request may be transmitted to the one or more other communication terminals through an intermediate processing unit. In other words, the intermediate processing unit receives the request from the first communication terminal prior to transmitting the request to the one or more other communication terminals. In addition, the intermediate processing unit may automatically determine the one or more other communication terminals based on one or more of the request and a predefined mapping. The predefined mapping may include, but is not limited to, correspondence information between the request and the one or more terminal identifiers. For example, the predefined mapping may specify correspondence between one or more rooms of a hotel and mobile phone numbers of one or more corresponding users to whom the one or more rooms are allotted. Accordingly, when a request for establishing the communication session between the first communication terminal and a room of the one or more rooms is generated, the intermediate processing unit may determine the mobile phone number of a guest to whom the room is allotted based on the predefined mapping. The predefined mapping may be created automatically by retrieving the correspondence information from one or more external sources. For example, the correspondence information of a guest and a mobile phone number of the guest may be retrieved from a registration database of the hotel. Additionally, the predefined mapping may be dynamically updated according to changes in the one or more external sources. Thus, in an embodiment, based on the predefined mapping, the intermediate processing unit may determine the one or more other communication terminals and transmit the request to the one or more other communication terminals.

Subsequent to receiving the request, the one or more other communication terminals may generate a response to the request at step 106. The response may include, but is not limited to, one or more of acceptance of the request, rejection of the request, an indication to wait. The response may be generated manually or automatically. For example, one or more users of the one or more other communication terminals may perform an action to generate the response. The action may include, but is not limited to, pressing one or more buttons and performing a gesture. Alternatively, the response may be automatically generated, for example, based on user defined policies.

The response may include one or more signals such as, but not limited to, an audio, a video, a multimedia, an image, a text and any other form of data that may be transmitted and received by the plurality of communication terminals. In a scenario, the one or more signals may be processed at the one or more other communication terminals before transmitting the one or more signals. For example, the processing may include one or more of compression, encryption and decryption.

Subsequent to the generation of the response, the response may be transmitted to the first communication terminal. The response may be transmitted through one or more of a wired communication link and a wireless communication link. The one or more of a wired communication link and a wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, Public Switched Telephone Network (PSTN), Universal Mobile Telecommunication Systems (UMTS), Ultra Mobile Broadband (UMB) network, terrestrial digital TV, radio and short-range radio.

In an embodiment, the response may be transmitted to the first communication terminal through the intermediate processing unit. In other words, the intermediate processing unit receives the response from the one or more other communication terminals prior to transmitting the response to the first communication terminal. In another embodiment, the response may be transmitted directly to the first communication terminal.

Thereafter, based on the response, at step 108, the communication session is established between the first communication terminal and the one or more other communication terminals. The communication session may include, but is not limited to, one or more of transmission and reception of one or more signals over, but not limited to, one or more of a wired communication link and/or a wireless communication link. A signal of the one or more signals includes, but is not limited to, an audio, a video, a multimedia, an image, a text or any other form of data that may be transmitted and received by the plurality of communication terminals. The one or more of a wired communication link and/or a wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, cellular network, Universal Mobile Telecommunication Systems (UMTS), Ultra Mobile Broadband (UMB) network, terrestrial digital TV, radio and short-range radio. For example, the communication session may be established over an IP network using a Session Initiation Protocol (SIP). As a result of establishing the communication session over one or more of a wired communication link and/or a wireless communication link, the method disclosed herein provides mobility to one or more users of the plurality of communication terminals of the intercom system.

In an embodiment of the present disclosure, the first communication terminal may be an intercom device that may be situated at a door, in a lobby or any other area of one or more of a residence, a hotel, an apartment, and a business office. The intercom device may generate a request in accordance with the method disclosed herein to establish the communication session with another communication terminal of the plurality of communication terminals. The another communication terminal may additionally or alternatively be a mobile phone associated with another user. In a scenario, the mobile phone of the another user may be associated with a location in one or more of a residence, a hotel, an apartment, and a business office. For example, the mobile phone may be associated with a room in which the another user is resident. The association between the mobile phone and the location may be created manually by updating the predefined mapping in the intermediate processing unit of the intercom system. Alternatively, the association between the mobile phone and the location may be created automatically when the another uses the mobile phone as a means for identifying the another user. For instance, the another user may use the mobile phone for unlocking a door to the room utilizing one or more of, but not limited to, RFID and crypto acoustic credential. In another instance, the association between the mobile phone and the location may be created when the another user is in proximity to a sensing device which is in communication with the intermediate processing unit. Accordingly, one or more attributes of the mobile phone may be transmitted to the intermediate processing unit in order to create the association between the another user and the location.

As a result of creating the association between the location and the mobile phone, the request generated by the user of the intercom device is transmitted to the mobile phone over a wireless communication link of the one or more of a wired communication link and/or a wireless communication link. In response to receiving the request, the mobile phone may generate a response based on an action performed by the another user. Subsequently, the mobile phone may transmit the response to the intercom device through a wireless communication link of the one or more of a wired communication link and/or a wireless communication link. Based on the response, the communication session is established between the intercom device and the mobile phone. As a result, the another user may participate in the intercom communication while being mobile.

Figure 2:
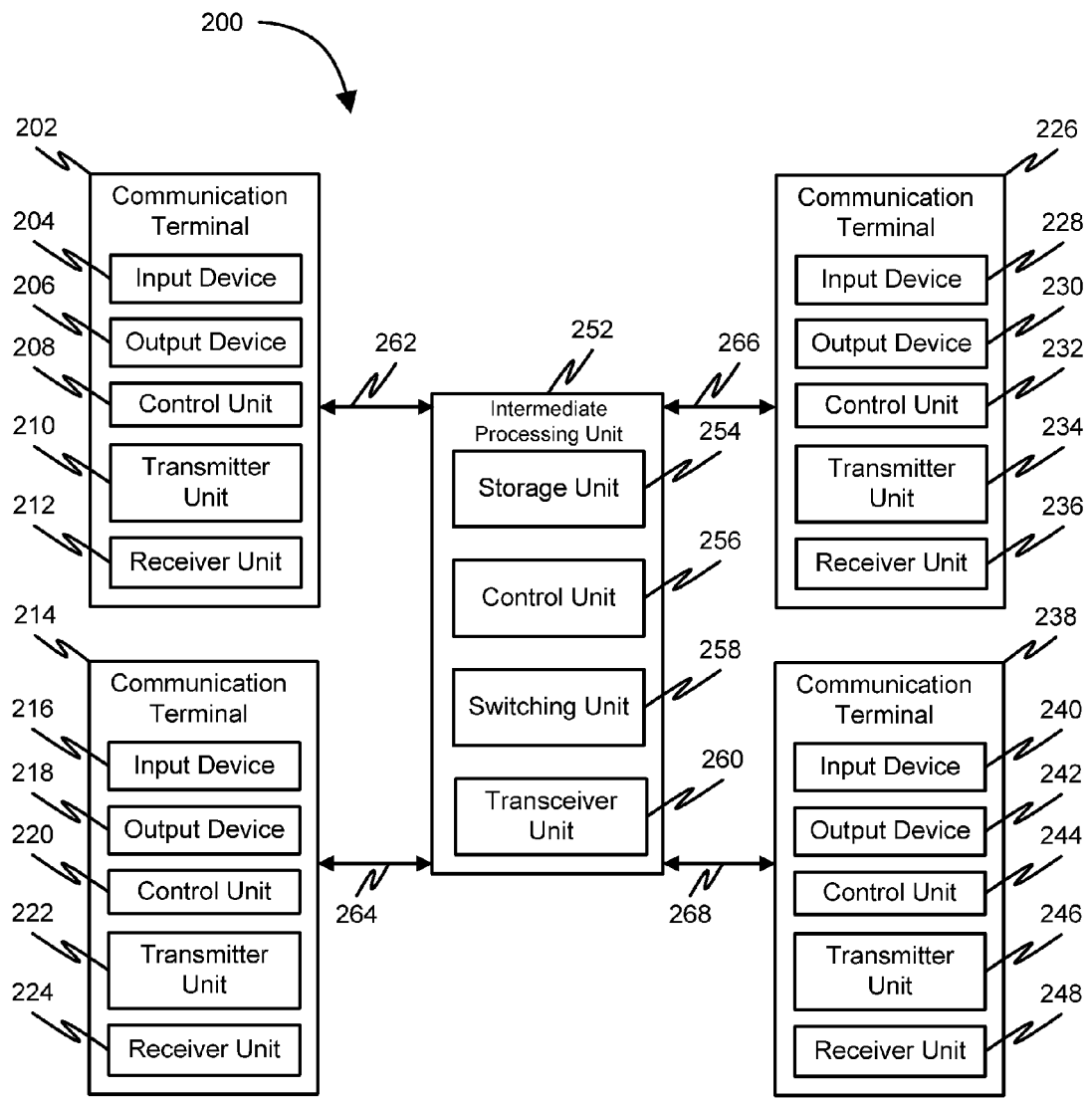
FIG. 2 illustrates a block diagram of a system for establishing a communication session between a plurality of communication terminals in an intercom system over one or more of a wired communication link and/or a wireless communication link in accordance with an embodiment of the present disclosure.

Turning now to FIG. 2, a block diagram of a system for establishing a communication session between a plurality of communication terminals in an intercom system over one or more of a wired communication link and a wireless communication link in accordance with an embodiment of the present disclosure is illustrated. System 200 includes the plurality of communication terminals such as a communication terminal 202, a communication terminal 214, a communication terminal 226 and a communication terminal 238. A communication terminal of the plurality of communication terminals may be, but is not limited to, a camera, a camcorder, a wristwatch, a remote controller of an appliance, a cell phone, a laptop, a desktop computer, an e-book reader, a Personal Digital Assistant (PDA), a handheld media player, a handheld television or any other wireless or wired device. System 200 also includes one or more of a wired communication link and a wireless communication link such as, communication link 262, communication link 264, communication link 266 and communication link 268 as illustrated in FIG. 2. The one or more of a wired communication link and/or wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, Public Switched Telephone Network (PSTN), Universal Mobile Telecommunication Systems (UMTS), Ultra Mobile Broadband (UMB) network, terrestrial digital TV, radio and short-range radio.

Further, a communication terminal of the plurality of communication terminals includes one or more of an input device, an output device, a control unit, a transmitter unit and a receiver unit. For example, communication terminal 202 includes input device 204, output device 206, control unit 208, transmitter unit 210 and receiver unit 212. The input device may be, but is not limited to, a press-button, a biometric scanner, a fingerprint scanner, a retinal scanner, a thermal sensor, a motion sensor, an image sensor, a sound sensor, keyboard, keypad, trackball, a storage device, and a tactile device, such as a joystick or dial. The output device may be, but is not limited to, a sound generator, an image generator, an electromechanical actuator and a storage device. The transmitter unit is configured to transmit one or more signals over the one or more of a wired communication link and/or a wireless communication link. For example, transmitter unit 210 is configured to transmit one or more signals over communication link 262. Similarly, the receiver unit is configured to receive the one or more signals over the one or more of a wired communication link and a wireless communication link. For example, receiver unit 212 is configured to receive one or more signals over communication link 262. The one or more signals may include, but is not limited to, an audio, a video, a multimedia, an image, a text or any other form of data that may be transmitted and received by the plurality of communication terminals. Further, the control unit may be configured to control one or more operations of the communication terminal. Additionally, the control unit may also perform one or more processes on the one or more signals. For example, control unit 208 may control and coordinate one or more operations of communication terminal 202 including functions such as call forwarding and so forth.

The communication terminal may be configured to generate a request for establishing a communication session with one or more other communication terminals of the plurality of communication terminals. The request may include one or more signals such as, but not limited to, an audio, a video, a multimedia, an image, a text and any other form of data that may be transmitted and received by the plurality of communication terminals. Accordingly, the control unit of the communication terminal may be configured to generate the request using one or more of a manual method and an automatic method. In the manual method, the control unit of the communication terminal may be configured to receive an action through the input device from a user of the communication terminal to generate the request. For example, control unit 208 may receive an action (e.g. a press) from the user on input device 204 (e.g. a button) and generate the request accordingly. Whereas, in the automatic method, the control unit of the communication terminal may be configured to generate the request upon detecting the presence of the user in proximity to the communication terminal through the input device. The input device may include one or more of a motion sensor, an image sensor, a face recognizer, a voice recognizer, a gait recognizer, a keyboard, keypad, trackball, a body-heat sensor, and a tactile device, such as a joystick or dial. In addition, the control unit may also be configured to determine the identity of the user. The identity of the user may be determined based on one or more of, but not limited to, a user-ID entered by the user or scanned for the user, a password entered by the user, a voice of the user, an image of the user, and a biometric feature of the user. The biometric feature of the user may include, but is not limited to, fingerprint, hand geometry print, signature, retinal print, iris print, and facial bone structure. Accordingly, the input device may include one or more of sensors configured to detect the biometric feature.

In an embodiment, the control unit of the communication terminal may be configured to generate the request based on one or more terminal identifiers corresponding to the one or more other communication terminals. For example, each of communication terminal 202, communication terminal 214, communication terminal 226 and communication terminal 238 may be assigned unique terminal identifiers. The one or more terminal identifiers may correspond to, without limitation, a hardware serial number, a cellular telephone number, a MAC address and an IP address. In an embodiment, the communication terminal may be configured to receive a specification of the one or more terminal identifiers from the user of the communication terminal. In another embodiment, the control unit of the communication terminal may be configured to automatically determine the one or more terminal identifiers based on one or more of, but not limited to, time information, location information, availability information of one or more users corresponding to the one or more other communication terminals, and identity of the user. The one or more terminal identifiers may be an end-point for the request. In yet another embodiment, the one or more terminal identifiers may be automatically determined based on one or more predefined rules. For example, a user of the one or more users corresponding to a communication terminal of the one or more other communication terminals may define a rule such as, "At a time when a request is generated, if the user is at home, then identify an end-point for the request as each communication terminal situated at home." In another example, the user may define another rule such as, "If a request is generated between 1 p.m. and 4 p.m., then identify an end-point for the request as a communication terminal situated in a kitchen and a mobile phone belonging to the user." The user may set this rule, or the user may set a rule in which any or all of the communication terminals are set to a silent mode, quiet mode, and/or vibration mode, in a scenario wherein, for example, the user's baby sleeps between 1 p.m. and 4 p.m. every day. A rule may also be defined such that if multiple communication terminals are available, the first one to be activated by the user controls communications. The identity of the user may be determined based on one or more of, but not limited to, data entered by the user, a user-ID entered by the user, a password entered by the user, a voice of the user, an image of the user, and a biometric feature of the user. The biometric feature of the user may include, but is not limited to, fingerprint, a hand geometry print, signature, retinal print, iris print, and facial bone structure. Accordingly, the input device may include one or more of sensors configured to detect the biometric feature.

Further, the transmitter unit in the communication terminal may be configured to transmit the request to the one or more other communication terminals of the plurality of communication terminals. The transmitter unit may be configured to transmit the request over one or more of a wired communication link and a wireless communication link. The one or more of a wired communication link and a wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, cellular network, Public Switched Telephone Network (PSTN), Universal Mobile Telecommunication Systems (UMTS), Ultra Mobile Broadband (UMB) network, terrestrial digital TV, radio and short-range radio. For example, transmitter unit 210 may be configured to transmit the request to communication terminal 226 over one or more of a wired communication link and a wireless communication link (not shown in FIG. 2). In a scenario, the control unit may be configured to process the request prior to transmitting the request. For example, the control unit may perform one or more of compression, encryption and decryption.

Further, in an embodiment, system 200 includes an intermediate processing unit such as intermediate processing unit 252. The intermediate processing unit includes a storage unit, a control unit, a switching unit and a transceiver unit. The transceiver unit may be configured to receive the request from the communication terminal prior to transmitting the request to the one or more other communication terminals. Further, the control unit may be configured to automatically determine the one or more other communication terminals based on one or more of the request and a predefined mapping. The predefined mapping may be stored in the storage unit of the intermediate processing unit. The predefined mapping may include, but is not limited to, correspondence information between the request and the one or more terminal identifiers. For example, the predefined mapping may specify correspondence between one or more rooms of a hotel and mobile phone number of communication terminal 226 belonging to a guest to whom one of the rooms is allotted. Accordingly, when a request for establishing the communication session between communication terminal 202 and the room is generated, control unit 256 of intermediate processing unit 252 may determine the mobile phone number, or other mobile device identifier, of the guest to whom the room is allotted based on the predefined mapping. The predefined mapping may be created automatically by retrieving the correspondence information from one or more external sources. For example, the correspondence information of the guest and the mobile phone number of the guest may be retrieved from the hotel registration database. Additionally, the predefined mapping may be dynamically updated according to changes in the one or more external sources. Thus, in an embodiment, based on the predefined mapping, the control unit of the intermediate processing unit may determine the one or more other communication terminals. In order to transmit the request to the determined one or more other communication terminals, the intermediate processing unit includes the switching unit. The switching unit may be configured to route the request to the one or more other communication terminals based on the output of the control unit.

The one or more other communication terminals include a control unit configured to generate a response to the request. The response may include, but is not limited to, one or more of acceptance of the request, rejection of the request, an indication to wait. The control unit of the one or more other communication terminals may be configured to generate the response either manually or automatically. For example, the control unit of the one or more other communication terminals may be configured to generate the response based on an action performed by one or more users of the one or more other communication terminals. The action may include, but is not limited to, pressing one or more buttons, speaking to a recognition program, and performing a gesture. Alternatively, the control unit of the one or more other communication terminals may be configured to automatically generate the response based on user defined policies. In an embodiment, the user defined policies may be stored in a storage unit of the one or more other communication terminals. For example, a policy of the user defined policies such as "do not disturb during night" may be stored in output device 230 of communication terminal 226 or in intermediate processing unit 252. Accordingly, when the request generated by communication terminal 202 is received by communication terminal 226, a response such as "decline request" may be generated. The response may include one or more signals such as, but not limited to, an audio, a video, a multimedia, an image, a text or any other form of data that may be transmitted and received by the plurality of communication terminals. In a scenario, the control unit of the one or more other communication terminals are configured to process the one or more signals before transmitting the one or more signals. For example, the control unit of the one or more other communication terminals may be configured to perform one or more of compression, encryption and decryption. Furthermore one or more mobile communication terminals may include one or more applications implemented to communicate with the other communication terminals.

Further, a transmitter unit of the one or more other communication terminals may be configured to transmit the response to the communication terminal. The transmitter unit may be configured to transmit the response over one or more of a wired communication link and/or a wireless communication link. For example, transmitter unit 234 may be configured to transmit the response to communication terminal 202 over one or more of a wired communication link and/or a wireless communication link (not shown in FIG. 2). The one or more of a wired communication link and a wireless communication link may include, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, 3rd Generation Partnership Project (3GPP), 2G network, 3G network, 4G network, LTE network, Public Switched Telephone Network (PSTN), Universal Mobile Telecommunication Systems (UMTS), Ultra Mobile Broadband (UMB) network, terrestrial digital TV, radio and short-range radio.

In an embodiment, the transmitter unit of the one or more other communication terminals may be configured to transmit the response to the communication terminal through the intermediate processing unit. In other words, the transceiver of the intermediate processing unit receives the response from the transmitter unit of the one or more other communication terminals prior to transmitting the response to the communication terminal. For example, transmitter unit 234 may transmit the request to intermediate processing unit 252. Subsequently, transceiver unit 260 transmits the request to communication terminal 202.

Further, one or more of the control unit of the communication terminal, the control unit of the intermediate processing unit and the control terminal of the one or more other communication terminals may be configured to establish the communication session between the communication terminal and the one or more other communication terminals based on the response. For example, if the response generated at communication terminal 226 is "accept request", then one or more of control unit 232, control unit 256 and control unit 208 may establish the communication session. In order to establish the communication session, one or more of the transmitter unit of the communication terminal, the transceiver of the intermediate processing unit, and the transmitter unit of the one or more other communication terminals may be configured to perform one or more of transmission and reception of one or more signals over, but not limited to, one or more of a wired communication link and/or a wireless communication link. A signal of the one or more signals includes, but is not limited to, an audio, a video, a multimedia, an image, a text or any other form of data that may be transmitted and received by the plurality of communication terminals. The one or more of a wired communication link and/or a wireless communication link, but are not limited to, Bluetooth, Internet Protocol (IP) network, Wireless Fidelity (Wi-Fi) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, 3rd Generation Partnership Project (3GPP), 2G network, 3G network, 4G network, cellular network, Universal Mobile Telecommunication Systems (UMTS), Ultra Mobile Broadband (UMB) network, terrestrial digital TV, radio and short-range radio. In an embodiment, one or more of the transmitter unit of the communication terminal, the transceiver of the intermediate processing unit, and the transmitter unit of the one or more other communication terminals may be configured to perform one or more of transmission and reception of one or more signals over an IP network using a Session Initiation Protocol (SIP). As a result of establishing the communication session over one or more of a wired communication link and/or a wireless communication link, the system disclosed herein provides mobility to one or more users of the plurality of communication terminals of the intercom system.

Figure 3:
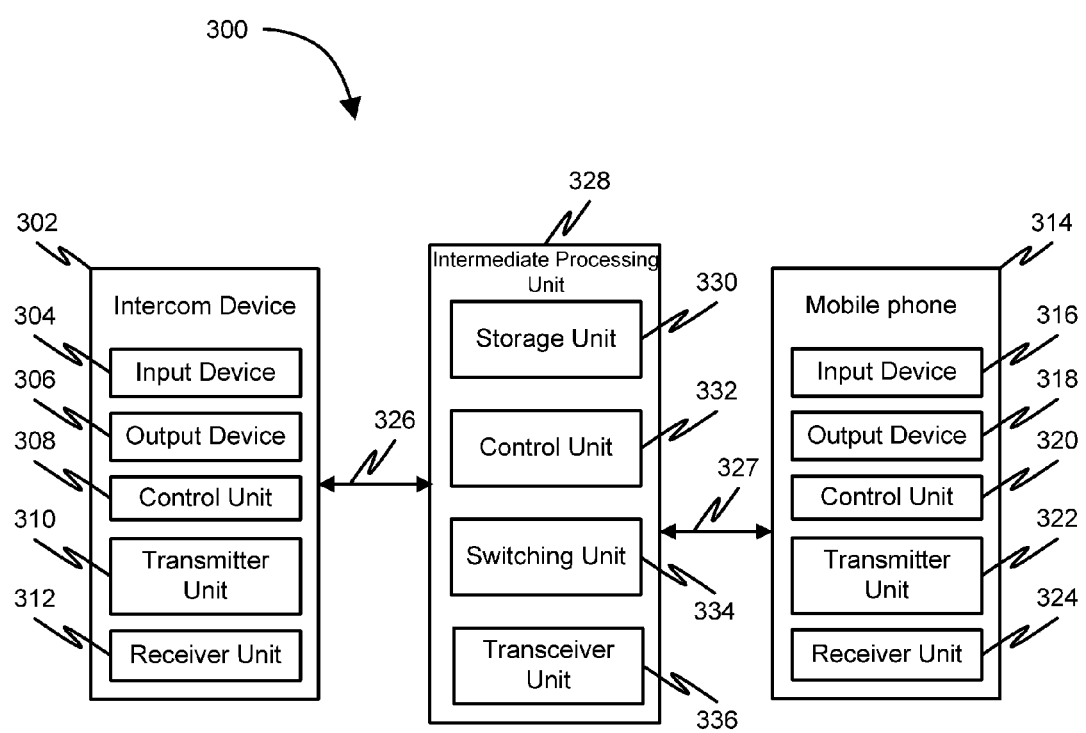
FIG. 3 illustrates a block diagram of a system for establishing a communication session between an intercom device and a mobile phone in accordance with another embodiment of the present disclosure.

Turning now to FIG. 3, a block diagram of a system for establishing a communication session between a communication terminal and a mobile phone in accordance with an exemplary embodiment of the present disclosure is illustrated. System 300 includes communication terminal 302 associated with a user and mobile phone 314 associated with another user. In an embodiment, communication terminal 302 may be an intercom device. In another embodiment, communication terminal 302 may be a standalone device used for surveillance purpose. Communication terminal 302 may be situated outside a guest room door of a hotel and may be accessed by one of the users. The other user may occupy the guest room of the hotel.

Communication terminal 302 includes input device 304 and output device 306. Input device 304 may include a camera, a motion sensor, a microphone and a storage device. The camera may be, but not limited to, an IP camera, a Network Video Recorder, a Digital Video Recorder, a webcam, and a Close Circuit Television (CCTV). In an embodiment, the camera may be situated as a standalone device that may communicate with communication terminal 302 using one or more of a wired communication link and/or a wireless communication link. The camera may be placed in any desired location, such as in a hallway, near elevators or steps, in the lobby area, outside the entrance door, and so forth. In another embodiment, the camera may be integrated into communication terminal 302 as one unit and, thus, deployed wherever the communication terminal 302 is deployed. Output device 306 may include a loudspeaker, a display unit and a storage device. In a scenario, the motion sensor may detect a movement outside the guest room door. The motion sensor may provide notification of the movement to control unit 308. In response to this, control unit 308 may actuate a signal to turn-on one or more lights situated at or near an entrance of the guest room door to illuminate the entrance. In addition, control unit 308 may actuate another signal to turn-on the camera, which may otherwise be in an idle state in order to save power. As such, until the actual communication session takes place, the camera may be configured to record video and to take intermittent still shots. Subsequently, the camera may transmit the recorded video and the still shots to a storage unit. The storage unit may be part of communication terminal 302 or may be external to communication terminal 302.

In an embodiment, the camera may be designed, configured and deployed along with specialized software for security purposes. The camera may recognize one or more objects in its field of vision with the help of the specialized software. The one or more objects may include, but not limited to, a food tray, a luggage cart, a trolley, a living being such as a person, or any other object. Thereafter, the camera may issue an alert to appropriate authorized personnel using a wired or wireless network based on the type of object recognized. For example, the camera may alert a bell-boy if it detects and recognizes a luggage cart lying unattended.

Similarly, the camera may be used to detect and recognize a person in its field of vision. The camera may use a facial recognition technique to recognize a person in its field of vision. It will be apparent to person skilled in the art that the camera may use any other technique to recognize a person in its field of vision. As such, an image of the person may be captured and transmitted using a transmitter unit in order to further process the image of the person. For example, the image of the person may be captured using the camera. Thereafter, control unit 308 may instruct transmitter unit 310 to transmit the image to intermediate processing unit 328. Communication terminal 302 may communicate with intermediate processing unit 328 using a communication link 326. Communication link 326 may be a Wireless Fidelity (Wi-Fi) network. However, it will be apparent to person skilled in the art that communication link 326 may include, but not limited to, Bluetooth, Internet Protocol (IP) network, Wide Area Network (WAN), Wireless Local Area Network (WLAN), Local Area Network (LAN), Metropolitan Area Network (MAN), Integrated Services Digital Network (ISDN), Broadband network, Wireless Interoperability Microwave Access (WiMAX) communication network, Session Initiation Protocol (SIP) Network, Session Initiation Protocol (SIP) Network, 3rd Generation Partnership Project (3GPP), 2G network, 3G network, 4G network, LTE network, Public Switched Telephone Network (PSTN), Universal Mobile Telecommunication Systems (UMTS), Ultra Mobile Broadband (UMB) network, terrestrial digital TV, radio and short-range radio.

Thereafter, transceiver unit 336 associated with processing unit 328 may receive the image. Then, control unit 332 may compare the image with images of known persons, staff, objects, and guests and persons wanted or warned about by law enforcement agencies already existing in storage unit 330. The comparison may be done local to the communication terminal or may be done off-site. If a predefined condition is met, such as if a facial match is found to be that of a known undesirable person or a criminal person, or if an object is recognized as an explosive device, emergency responders, such security personnel or other party may be alerted immediately. The predefined condition, and/or a predefined algorithm, may be defined by a user of an interior of the room, dwelling, residence, enclosed space, or building structure or may be defined by a public or private entity, such as a security company, hotel, law enforcement agency, and so forth. In addition, the image may be stamped with location, time and date. Then the image may be stored in storage unit 330 for future use. However, if the facial match is found to be that of a valid guest image, the match may be used for guest services in various ways. For example, the guest room door may be released or the valid guest may be greeted with the guests name as the guest enters the room.

In an embodiment, if the facial match is found to be that of a valid guest image, the user who is currently registered to the guest room of the hotel may be notified of the presence of the other guest. In a scenario, a notification may be transmitted on mobile phone 314 of the user currently occupying the guest room. In order to receive the notification in this manner, mobile device 314 belonging to the user currently occupying the guest room may be associated with the guest room. Mobile phone 314 may be associated with the guest room either beforehand or in real-time. In other words, mobile phone 314 may be associated with the guest room before the user checks-in to the guest room or after the user checks-in to the guest room of the hotel. The association may be carried out in one or more of the following ways. The characteristics and settings of the mobile phone 314, such as one or more of a telephone number, a model number of mobile phone 314, a MAC address of mobile phone 314 and a preferred network use of mobile phone 314 may be transmitted to one or more of communication terminal 302 and intermediate processing unit 328. The transmission of the characteristics and settings of mobile phone 314 may be done either manually or automatically, or both. For example, one or more of control unit 308 and control unit 332 may automatically detect the presence of mobile phone 314 in proximity and may fetch characteristics and settings of mobile phone 314 in real-time. The detection may be performed by one or more of an input device of communication terminal 302 and a control unit of intermediate processing unit 328. On the other hand, the another user may manually search one or more of control unit 308 and control unit 332 in the proximity using a search feature provided by mobile phone 314. Thereafter, in order to associate mobile phone 314 with the guest room, the user may manually transmit the characteristics and settings of mobile phone 314 to one or more of control unit 308 and control unit 332. Similarly, mobile phone 314, with prior authorization from the user, may automatically search one or more of control unit 308 and control unit 332 in its proximity in real-time. Subsequently, in order to associate mobile phone 314 with the guest room, the characteristics and settings of mobile phone 314 may be transmitted automatically to one or more of control unit 308 and control unit 332.

Thereafter, when a request to establish an audio and/or video communication session between communication terminal 302 and mobile phone 314 is generated, transmitter unit 310 may transmit the request to transceiver unit 336. Subsequently, transceiver unit 336 may in turn transmit the request to receiver unit 324 of mobile phone 314. For example, the request may include the image of a friend of the another user. Subsequently, receiver unit 324 of mobile phone 314 may receive the image of the friend. Thereafter, control unit 320 may process the image of the friend in order to display the image to the user on output device 318. In addition, the user may be notified by playing a sound on the loudspeaker. Thereafter, the user may respond to this notification. The user's response to the notification is captured using input device 316. If the user's response indicates that the user wishes to engage in a conversation with the friend, the video communication session is established between communication terminal 302 and mobile phone 314. As a result, the user currently associated with the guest room can conveniently participate in an intercom communication session while being mobile.

According to one implementation, a method includes receiving from one or more monitoring devices, such as a communication terminal associated with an outside entrance of a room, dwelling, residence, enclosed space, or building structure, identifying information pertaining to a person or object in the proximity of the monitoring device. The identifying information may include identity or other identifying characteristic of a person, animal, or object such as the type, gender, or physical characteristics of the person, animal or object. The identifying information may be received by an intermediate processing unit, or by any information processing computing device operated by a user of the monitoring device, a public entity, or private entity. A public entity may include a government organization, emergency response organization, and so forth. A private entity may include a security company, device monitoring company, and so forth. Once received, the identity information is compared to information in one or more database systems and analyzed based on at least one predefined condition and/or algorithm, the predefined condition or algorithm defined by the user of the monitoring device, for the user of the monitoring device, by the public entity, or by the private entity. The predefined condition and/or algorithm may be based on the identifying of a person known or unknown to the user. The identified person may include persons approved of by the user of the monitoring device, i.e., family, employees, etc, and/or persons not approved by the user of the monitoring device, i.e., known criminal offenders, ex-spouses, and so forth. The results of the comparison may be transmitted to the user of the monitoring device. For example, the results may be displayed to a user through a communication terminal as text, as an image, or as an audible alert of the presence of the person in the proximity of the monitoring device. The user may be remote to the monitoring device, the intermediate processing unit, and/or the processing computing device operated by the user, the public entity, or the private entity. The public entity or private entity may charge a fee for conducting the comparison and/or delivering the results of the comparison to the user.

In the foregoing disclosure, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense, and all such modifications are intended to be included within the scope of the present disclosure. The benefits, advantages, solutions to problems, and any element(s) that may cause any benefit, advantage, or solution to occur or become more pronounced are not to be construed as a critical, or required.

Moreover, the above disclosure is meant only to provide examples of the implementations and is not intended to limit the claimed invention. For example, although several examples describe a hotel environment, the concepts apply equally to housing environments (detached and semi-detached homes, apartments, condos), business environments and so forth.

The invention claimed is:

1. A communication terminal associated with an outside entrance of a room, dwelling, residence, enclosed space, or building structure, comprising:
a control unit of the communication terminal configured to generate a request for establishing a communication session with at least one of a plurality of end points associated with an occupant of the room, dwelling, residence, enclosed space, or building structure;
wherein the plurality of end points are selected by the occupant;
wherein the control unit initiates a communication link with each end point selected by the occupant via a terminal identifier selected from the group consisting of a hardware serial number, a mobile phone number, a MAC address, an IP address, a radio frequency ID (RFID), and a crypto acoustic credential;
wherein the communication session is established with the at least one end point based on a rule determined by the occupant for administering the end points; and
a rule configurable by the occupant for directing the control unit;
wherein the rule is capable of directing the control unit to route the request in an occupant-selected sequence among the end points including a camera, a camcorder, a wristwatch, a controller of an appliance, a cell phone, a laptop computer, a desktop computer, an e-book reader, a Personal Digital Assistant (PDA), a handheld media player, and a handheld television.

2. The communication terminal of claim 1, wherein the request is generated upon detecting the presence of a user or object in proximity to the communication terminal associated with an outside entrance of a room, dwelling, residence, enclosed space, or building structure.

3. The communication terminal of claim 1, wherein the communication terminal is configured to collect identity information pertaining to a person or object in the proximity of the entrance to the room, dwelling, residence, enclosed space, or building structure and to transmit the identity information to the occupant or a third party.

4. The communication terminal of claim 3, wherein a response is automatically generated based on an occupant-defined policy and the communication session includes providing the automatically generated response to the communication terminal.

5. The communication terminal of claim 1, wherein the control unit is configured to transmit the request through an intermediate processing unit, the intermediate processing unit configured to select which one of the plurality of end points associated with the occupant to establish the communications session with based at least in part on a physical proximity of each end point to a sensor in communication with the intermediate processing unit.

6. The communication terminal of claim 1, wherein the control unit automatically maps an identity of the occupant and the plurality of end points associated with the occupant to the room, dwelling, residence, enclosed space, or building structure based on a hotel registration database.

7. The communication terminal of claim 1, wherein the communication terminal is configured to communicate with an intermediate processing unit and wherein one of the communication terminal or intermediate processing unit determine when a predefined condition is met with regard to an identified person or object.

8. A method comprising:
generating a request at a control unit of a communication terminal associated with the outside of a room, dwelling, residence, enclosed space, or building structure for establishing a communication session with an end point of a plurality of end points selected by an occupant of the room, dwelling, residence, enclosed space, or building structure;
initiating a communication link between each occupant-selected end point and the control unit via a terminal identifier selected from the group consisting of a hardware serial number, a mobile phone number, a MAC address, an IP address, a radio frequency ID (RFID), and a crypto acoustic credential;
transmitting the request to the end point based on a rule capable of directing the control unit to route the request in an occupant-selected sequence among the end points including a camera, a camcorder, a wristwatch, a controller of an appliance, a cell phone, a laptop computer, a desktop computer, an e-book reader, a Personal Digital Assistant (PDA), a handheld media player, and a handheld television;
receiving from the end point a response to the request at the communication terminal; and
establishing a communication session between the communication terminal and the end point.

9. The method of claim 8, wherein the request is generated upon detecting the presence of a user or object in proximity to the communication terminal.

10. The method of claim 8, wherein the response is automatically generated based on a user defined policy and establishing a communication session includes automatically communicating a predetermined response to the first communication terminal.

11. The method of claim 8, wherein the request is transmitted to the end point through an intermediate processing unit, the intermediate processing unit configured to select which one or more of the plurality of end points associated with the occupant to establish the communications session with based on the predetermined policy or based on an occupant selection of an end point from the plurality of end points.

12. The method of claim 8, further comprising automatically mapping an identity of the occupant and the plurality of end points associated with the occupant to the room, dwelling, residence, enclosed space, or building structure based on a hotel registration database.

13. The method of claim 8, wherein the communication terminal communicates with an intermediate processing unit and the communication terminal or the intermediate processing unit determines whether a predefined condition is met with regard to an identified person or object.

14. An intercom system comprising:
a communication terminal associated with an outside entrance to a room, dwelling, residence, enclosed space, or building structure;
a control unit of the communication terminal configured to generate a request for establishing a communication session with one or more end points of a plurality of end points selected by an occupant of the room, residence, enclosed space, or building structure; and
an intermediate processing unit for receiving the request from the communication terminal and determining according to a rule with which of the one or more end points to establish the communication session; and
wherein the rule directs the control unit to route the request in an occupant-selected sequence among the end points including a camera, a camcorder, a wristwatch, a controller of an appliance, a cell phone, a laptop computer, a desktop computer, an e-book reader, a Personal Digital Assistant (PDA), a handheld media player, and a handheld television.

15. The intercom system of claim 14, wherein the communication terminal associated with the outside entrance of the room, dwelling, residence, enclosed space, or building structure is configured to:
 transmit the request to the intermediate processing unit;
 receive a response to the request from the one or more end points or from the intermediate processing unit; and
 establish a communication session between the communication terminal and the one or more end points or between the communication terminal and the intermediate processing unit.

16. The intercom system of claim 14, wherein the request is generated upon detecting the presence of a user or object in proximity to the communication terminal.

17. The intercom system of claim 14, wherein the response is automatically generated based on an occupant-defined policy and the communication session includes providing the automatically generated response to the communication terminal.

18. The intercom system of claim 14, wherein the control unit automatically maps an identity of the occupant and the one or more end points associated with the occupant to the room, dwelling, residence, enclosed space, or building structure based on a hotel registration database.

19. The intercom system of claim 14, wherein the communication terminal or the intermediate processing unit determines whether a predefined condition is met with regard to an identified person or object.

20. The intercom system of claim 19, wherein the predefined condition is a facial match between the identified person and a stored image of the identified person signaling the communication terminal or the intermediate processing unit to unlock a door.

21. A device comprising:
 an input device to collect identifying information of a person or object in a proximity of the device;
 a transmitter device to send the identifying information to at least one end point of a plurality of end points selected by a user of the device, including a third party, or one or more database systems for analysis based on at least one algorithm or predefined condition defined by the user;
 a control unit to send the identifying information to the at least one end point based on a rule determined by the user for administering a plurality of the end points; and
 wherein the rule is capable of directing the control unit to route the identifying information in a user-selected sequence among the end points including a camera, a camcorder, a wristwatch, a controller of an appliance, a cell phone, a laptop computer, a desktop computer, an e-book reader, a Personal Digital Assistant (PDA), a handheld media player, a handheld television, a third party, and a database.

22. A method comprising:
 receiving from one or more monitoring devices, identifying information of a person or an object in a proximity of the one or more monitoring devices;
 comparing the identifying information received from the one or more monitoring devices to information in one or more databases systems based on at least one algorithm defined by a user of the one or more monitoring devices;
 transmitting the result of the comparison to an end point of the user;
 selecting the end point of the user from a plurality of end points according to a rule; and
 wherein the rule is capable of routing the identifying information in a user-selected sequence among the plurality of end points including a camera, a camcorder, a wristwatch, a controller of an appliance, a cell phone, a laptop computer, a desktop computer, an e-book reader, a Personal Digital Assistant (PDA), a handheld media player, and a handheld television.

23. The method of claim 22, further comprising assessing a fee to the user for the comparison.

24. The method of claim 22, wherein the comparison is performed using a database stored on the monitoring device or using a database stored on a mobile device associated with the user.

25. The method of claim 22, wherein the comparison is performed remotely from the monitoring device or remotely from a mobile device associated with the user.

* * * * *